United States Patent
Bi

(10) Patent No.: US 12,432,609 B2
(45) Date of Patent: Sep. 30, 2025

(54) METHODS AND APPARATUS FOR PACKET FLOW TO DATA RADIO BEARER MAPPING

(71) Applicant: Huawei Technologies Co., Ltd., Shenzhen (CN)

(72) Inventor: Hao Bi, Lake Zurich, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 595 days.

(21) Appl. No.: 17/662,330

(22) Filed: May 6, 2022

(65) Prior Publication Data

US 2022/0264359 A1 Aug. 18, 2022

Related U.S. Application Data

(63) Continuation of application No. PCT/US2020/059523, filed on Nov. 6, 2020.

(60) Provisional application No. 62/931,566, filed on Nov. 6, 2019.

(51) Int. Cl.
*H04W 28/02* (2009.01)
*H04W 28/20* (2009.01)

(52) U.S. Cl.
CPC ... *H04W 28/0257* (2013.01); *H04W 28/0263* (2013.01); *H04W 28/0268* (2013.01); *H04W 28/20* (2013.01)

(58) Field of Classification Search
None
See application file for complete search history.

(56) References Cited

U.S. PATENT DOCUMENTS

| | | | | |
|---|---|---|---|---|
| 2019/0320362 A1* | 10/2019 | Liu | ............... | H04W 28/0263 |
| 2020/0236578 A1* | 7/2020 | Cakulev | ............ | H04L 47/245 |
| 2020/0245184 A1* | 7/2020 | Jin | .......... | H04L 45/74 |
| 2020/0322804 A1* | 10/2020 | Vutukuri | ............ | H04W 12/106 |
| 2022/0256505 A1* | 8/2022 | Qi | ........... | H04W 76/40 |

FOREIGN PATENT DOCUMENTS

| | | |
|---|---|---|
| EP | 3720178 A1 | 10/2020 |
| WO | 2019157631 A1 | 8/2019 |
| WO | WO-2019213856 A1 * | 11/2019 |

OTHER PUBLICATIONS

English Translation of WO 2019213856A1 (Year: 2019).*
Huawei, et al., "QoS Flow to DRB Re-Mapping," 3GPP TSG-RAN2 Meeting #97bis, R2-1702614, Agenda Item 10.3.4.2, Spokane, Washington, Apr. 3-7, 2017, 6 pages.
Huawei, et al., "QoS Flow to DRB Re-Mapping," 3GPP TSG-RAN WG2#99 Meeting, R2-1708938, Agenda item 10.3.4.3, Berlin, Germany, Aug. 21-25, 2017, 6 pages.

(Continued)

*Primary Examiner* — Saumit Shah
(74) *Attorney, Agent, or Firm* — Slater Matsil, LLP

(57) ABSTRACT

A method for mapping quality of service (QoS) flows to data radio bearers includes determining a cumulative data volume of a first QoS flow; and determining that the cumulative data volume of the first QoS flow meets a specified data threshold, and based thereon: mapping the first QoS flow to a first data radio bearer, where a maximum data volume of the first data radio bearer is less than a maximum data volume of the first QoS flow; and transmitting a packet of the first QoS flow over the first data radio bearer.

20 Claims, 6 Drawing Sheets

(56) References Cited

OTHER PUBLICATIONS

Mediatek Inc., "QoS Flow to DRB Remapping during Handover," 3GPP TSG-RAN WG2 Meeting #103, R2-1812953, Agenda 10.2.3, Gothenburg, Sweden, Aug. 20-24, 2018, 6 pages.
Nokia, et al., "Relocating QoS Flows from the Default DRB," 3GPP TSG-RAN WG2 Meeting #103bis, R2-1814214, Agenda item 10.2.4, Chengdu, China, Oct. 8-12, 2018, 2 pages.

\* cited by examiner

METHODS AND APPARATUS FOR PACKET FLOW TO DATA RADIO BEARER MAPPING

CROSS-REFERENCE TO RELATED APPLICATIONS

This application is a continuation of International Application No. PCT/US2020/059523, filed on Nov. 6, 2020, entitled "Methods and Apparatus for Packet Flow to Data Radio Bearer Mapping," which claims the benefit of U.S. Provisional Application No. 62/931,566, filed on Nov. 6, 2019, entitled "Method and Apparatus for Quality of Service Flow to Data Radio Bearer Mapping," which applications are hereby incorporated herein by reference in their entireties.

TECHNICAL FIELD

The present disclosure relates generally to methods and apparatus for digital communications, and, in particular embodiments, to methods and apparatus for packet flow to data radio bearer mapping.

BACKGROUND

Current generation wireless communications systems provide high data rates for mobile communications devices to enable a rich multi-media environment for users of the mobile communications devices. However, the complexity of applications available to the users continues to increase, along with the need for increased throughput and lower latency.

However, different flows, such as different Quality of Service (QoS) flows, have different data requirements. Therefore, mapping a low data flow to a data radio bearer (DRB) with high data burst volume would inefficiently utilize the available data burst volume, while mapping a high data flow to a DRB with low data burst volume would result in failure to meet the data burst volume requirement of the high data flow. Therefore, there is a need for methods and apparatus for mapping flows to DRBs that meet data burst requirements of the flows.

SUMMARY

According to a first aspect, a method for mapping quality of service (QoS) flows to data radio bearers is provided. The method comprising: determining, by a communication device, a cumulative data volume of a first QoS flow; and determining, by the communication device, that the cumulative data volume of the first QoS flow meets a specified data threshold, and based thereon: mapping, by the communication device, the first QoS flow to a first data radio bearer, where a maximum data volume of the first data radio bearer is less than a maximum data volume of the first QoS flow; and transmitting, by the communication device, a packet of the first QoS flow over the first data radio bearer.

In a first implementation form of the method according to the first aspect, further comprising receiving, by the communication device, a data radio bearer configuration for the first data radio bearer.

In a second implementation form of the method according to the first aspect or any preceding implementation form of the first aspect, the data radio bearer configuration being received in a radio resource control (RRC) message.

In a third implementation form of the method according to the first aspect or any preceding implementation form of the first aspect, further comprising: determining, by the communication device, a cumulative data volume of a second QoS flow; and determining, by the communication device, that the cumulative data volume of the second QoS flow fails to meet the specified data threshold, and based thereon: mapping, by the communication device, the second QoS flow to a second data radio bearer, where the maximum data volume of the second data bearer is greater than a maximum data volume of the second QoS flow; and transmitting, by the communication device, a packet of the second QoS flow over the second data radio bearer.

In a fourth implementation form of the method according to the first aspect or any preceding implementation form of the first aspect, the communication device comprising a user equipment (UE).

In a fifth implementation form of the method according to the first aspect or any preceding implementation form of the first aspect, mapping the first QoS flow to the first data radio bearer being performed by a service data application protocol (SDAP) layer entity of the communication device.

According to a second aspect, a method for mapping QoS flows to data radio bearers is provided. The method comprising: determining, by a communication device, a cumulative characteristic measure of a QoS flow; mapping, by the communication device, the QoS flow to one of a plurality of data radio bearers in accordance with the cumulative characteristic measure of the QoS flow; and transmitting, by the communication device, a packet of the QoS flow over the mapped data radio bearer.

In a first implementation form of the method according to the second aspect, further comprising receiving, by the communication device, a data radio bearer configuration for the plurality of data radio bearers in a RRC message.

In a second implementation form of the method according to the second aspect or any preceding implementation form of the second aspect, mapping the QoS flow to the one of the plurality of data radio bearers comprising: determining, by the communication device, if the cumulative characteristic measure of the QoS flow meets a specified characteristic threshold; mapping, by the communication device, the QoS flow to a first data radio bearer in response to determining that the cumulative characteristic measure of the QoS flow meets the specified characteristic threshold; and mapping, by the communication device, the QoS flow to a second data radio bearer in response to determining that the cumulative characteristic measure of the QoS flow fails to meet the specified characteristic threshold, where a cumulative characteristic measure of the first data radio bearer is greater than a cumulative characteristic measure of the second data radio bearer.

In a third implementation form of the method according to the second aspect or any preceding implementation form of the second aspect, the cumulative characteristic measure comprising at least one of a maximum data burst volume, a cumulative data rate, a cumulative latency, a cumulative delay, or a cumulative Fifth Generation QoS identifier parameter.

In a fourth implementation form of the method according to the second aspect or any preceding implementation form of the second aspect, mapping the QoS flow to the one of the plurality of the plurality of data radio bearers occurs dynamically.

According to a third aspect, a device is provided. The device comprising: one or more processors; and a non-transitory memory storage comprising instructions that, when executed by the one or more processors, cause the device to: determine a cumulative data volume of a first QoS flow; and determine that the cumulative data volume of the first QoS flow meets a specified data threshold, and based thereon: map the first QoS flow to a first data radio bearer, where a maximum data volume of the first data radio bearer is less than a maximum data volume of the first QoS flow; and transmit a packet of the first QoS flow over the first data radio bearer.

In a first implementation form of the device according to the third aspect, the instructions further cause the device to receive a data radio bearer configuration for the first data radio bearer.

In a second implementation form of the device according to the third aspect or any preceding implementation form of the third aspect, the data radio bearer configuration being received in a RRC message.

In a third implementation form of the device according to the third aspect or any preceding implementation form of the third aspect, the instructions further cause the device to determine a cumulative data volume of a second QoS flow; and determine that the cumulative data volume of the second QoS flow fails to meet the specified data threshold, and based thereon: map the second QoS flow to a second data radio bearer, where the maximum data volume of the second data radio bearer is greater than a maximum data volume of the second QoS flow; and transmit a packet of the second QoS flow over the second data radio bearer.

In a fourth implementation form of the device according to the third aspect or any preceding implementation form of the third aspect, the device comprising a UE.

In a fifth implementation form of the device according to the third aspect or any preceding implementation form of the third aspect, a SDAP layer entity of the device maps the first QoS flow to the first data radio bearer.

According to a fourth aspect, a device is provided. The device comprising: one or more processors; and a non-transitory memory storage comprising instructions that, when executed by the one or more processors, cause the device to: determine a cumulative characteristic measure of a QoS flow; map the QoS flow to one of a plurality of data radio bearers in accordance with the cumulative characteristic measure of the QoS flow; and transmit a packet of the QoS flow over the mapped data radio bearer.

In a first implementation form of the device according to the fourth aspect, the instructions further cause the device to receive a data radio bearer configuration for the plurality of data radio bearers in a RRC message.

In a second implementation form of the device according to the fourth aspect or any preceding implementation form of the fourth aspect, the instructions further cause the device to determine if the cumulative characteristic measure of the QoS flow meets a specified characteristic threshold; map the QoS flow to a first data radio bearer in response to determining that the cumulative characteristic measure of the QoS flow meets the specified characteristic threshold; and map the QoS flow to a second data radio bearer in response to determining that the cumulative characteristic measure of the QoS flow fails to meet the specified characteristic threshold, where a cumulative characteristic measure of the first data radio bearer is greater than a cumulative characteristic measure of the second data radio bearer.

In a third implementation form of the device according to the fourth aspect or any preceding implementation form of the fourth aspect, the cumulative characteristic measure comprising at least one of a maximum data burst volume, a cumulative data rate, a cumulative latency, a cumulative delay, or a cumulative Fifth Generation QoS identifier parameter.

In a fourth implementation form of the device according to the fourth aspect or any preceding implementation form of the fourth aspect, the mapping of the QoS flow to the one of the plurality of the plurality of data radio bearers occurs dynamically.

An advantage of a preferred embodiment is that the cumulative data burst volume requirement of a flow is met by mapping the flow to a data radio bearer (DRB) with a data burst volume that meets the cumulative data burst volume requirement of the flow without excessively exceeding the cumulative data burst volume requirement, thereby meeting the cumulative data burst volume requirement of the flow without incurring inefficiencies associated with simply assigning the flow to a single DRB with excessive cumulative data burst volume.

Yet another advantage of a preferred embodiment is that the mapping of flows to DRBs may use other cumulative flow characteristics measures, such as latency, delay, data rate, etc.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
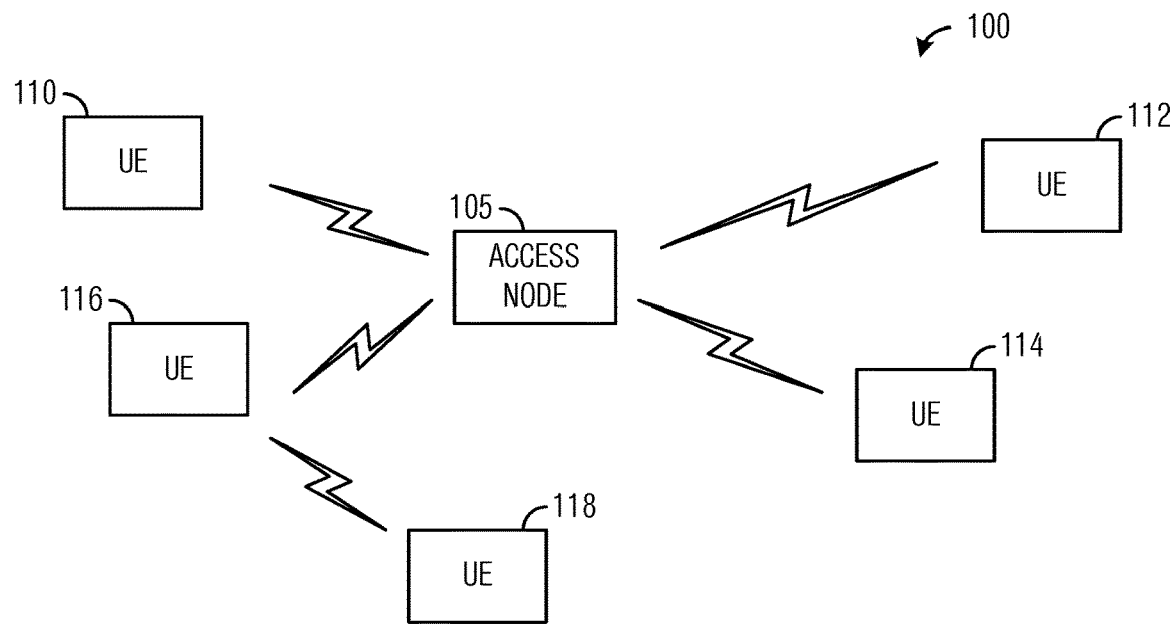
FIG. 1 illustrates an example communications system.

FIG. 1 illustrates an example communications system 100. Communications system 100 includes an access node 105 serving user equipments (UEs), such as UEs 110, 112, 114, 116, and 118. Access node 105 is connected to a backhaul network that provides connectivity to services and the Internet. In a first operating mode, communications to and from a UE passes through access node 105. In a second operating mode, communications to and from a UE do not pass through access node 105, however, access node 105 typically allocates resources used by the UE to communicate when specific conditions are met. Communication between a UE pair in the second operating mode occurs over sidelinks, comprising uni-directional communication links. Communication between a UE and access node pair also occur over uni-directional communication links, where the communication links between the UE and the access node are referred to as uplinks, and the communication links between the access node and UE is referred to as downlinks.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

In prior art 3GPP communication systems, UEs are configured with Quality of Service (QoS) flow to data radio bearer (DRB) mapping rules in a semi-static fashion. This means that there is no dynamic switching between QoS flow to DRB mappings.

The maximum data burst volume (MDBV) is the largest amount of data that a 5G access network (5G-AN) is required to serve within a period of a 5G-AN packet delay budget (PDB). For guaranteed bit rate (GBR) QoS flows with delay critical GBR resource type, a packet is deemed as being lost if it is delayed more than its associated PDB. The packet is also included in the packet error rate (PER) calculation unless the data burst exceeds the MDBV within the period of the PDB or the QoS flow is exceeding the guaranteed flow bit rate (GFBR). Each GBR QoS flow may be associated with an averaging window. The averaging window representing the duration over which the GFBR and the maximum flow bit rate (MFBR) are calculated (e.g., in the radio access network (RAN), AN, user plane function (UPF), UE, etc.). Table 1 presents default priority levels, PDB, PER, averaging window size, and example services for different 5G QoS identifier (5QI) parameter values.

TABLE 1

Example default priority levels, PDB, PER, averaging window size, and example services for different 5G QoS identifier (5QI) parameter values

| 5QI Value | Default Priority Level | PDB | PER | Default Averaging Window | Example Services |
|---|---|---|---|---|---|
| 2 | 40 | 150 ms | $10^{-3}$ | 2000 ms | Conversational video (live streaming) |
| 3 | 30 | 50 ms | $10^{-3}$ | 2000 ms | Real-time gaming, V2X messages, Electricity distribution - medium voltage, Process automation - monitoring |
| 65 | 7 | 75 ms | $10^{-2}$ | 2000 ms | Mission critical user plane Push to talk voice (e.g., MCPTT) |
| 67 | 15 | 100 ms | $10^{-3}$ | 2000 ms | Mission critical video user plane |

Figure 2:
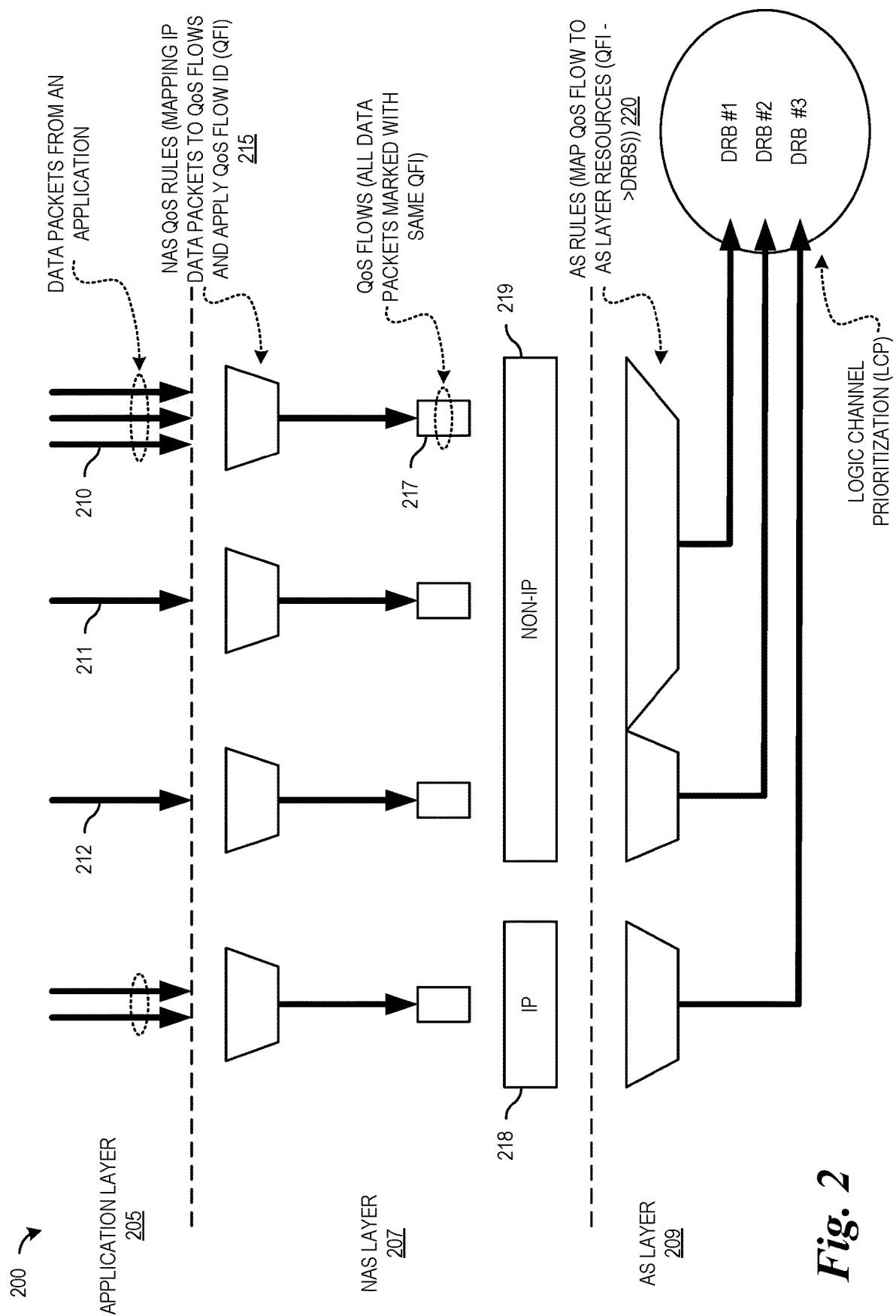
FIG. 2 illustrates a diagram of the mapping of data packets to data radio bearers (DRBs)

FIG. 2 illustrates a diagram 200 of the mapping of data packets to DRBs. The mapping of data packets to DRBs occurs over multiple layers, including an application layer 205, a non-access stratum (NAS) layer 207, and an access stratum (AS) layer 209. In application layer 205, data packets (such as data packets 210, 211, and 212) are generated by an application. In NAS layer 207, NAS QoS rules 215 map the data packets to QoS flows, such as QoS flow 217. In addition, QoS flow identifiers (QFI) are applied to packets of the QoS flows, where the packets of a single QoS flow has the same QFI. The QoS flows may be segregated into Internet Protocol (IP) flows 218 or non-IP flows 219, for example. In AS layer 209, AS rules 220 map the QoS flows to DRBs. As an example, packets with a certain QFI are mapped to a particular DRB.

Figure 3:
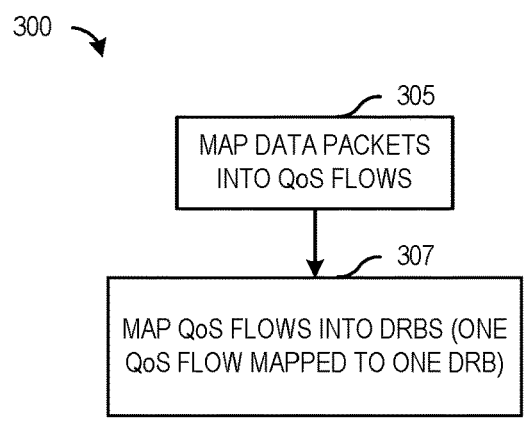
FIG. 3 illustrates a flow diagram of operations occurring in a prior art technique for mapping data packets to DRBs.

FIG. 3 illustrates a flow diagram of operations 300 occurring in a prior art technique for mapping data packets to DRBs. The mapping of the data packets includes mapping the data packets to QoS flows (block 305). As discussed previously, the mapping of the data packets to QoS flows occurs in the NAS layer and utilizes NAS QoS rules. A QFI is also applied to the packets of each QoS flow. The packets of the QoS flows are mapped to DRBs (block 307). The mapping of packets of the QoS flows to DRBs is performed in the AS layer. The packets of a QoS flow are mapped to one DRB, for example. The mapping of the QoS flows to DRBs follows the semi-statically configured mapping rules, which are not capable of dynamically switching between different mappings of QoS flow to DRB.

According to an example embodiment, methods and apparatus are provided for dynamic switching of QoS flows to DRBs mappings. The dynamic switching of the mappings may be based on cumulative characteristic measures of the QoS flows, such as MDBV, data rate, latency, delay, any other 5QI, etc. A cumulative characteristic measure may be a running sum (or summation) of a characteristic measure (such as MDBV, data rate, latency, delay, any other 5QI, etc.) over a time duration, for example. In an embodiment, based on a comparison of a cumulative characteristic measure of a QoS flow with one or more thresholds, one of a plurality of DRBs is selected and the packets of the QoS flow are mapped to the selected DRB. The QoS flows to DRBs mappings are configured using signaling, such as radio resource control (RRC) signaling, however, other types of signaling are possible.

As an illustrative example, the QoS flows to DRBs mappings are configured using RRC signaling. In addition to the mappings, the configuration also specifies the switching conditions, such as the characteristic measures used to determine which mapping to select, as well as the thresholds of the characteristic measures used in the comparison of the characteristic measures. An example configuration with a QoS flow mapping to two DRBs is as follows:

```
SDAP-Config ::=              SEQUENCE {
    pdu-Session                  PDU-SessionID,
    sdap-HeaderDL                ENUMERATED {present, absent},
    sdap-HeaderUL                ENUMERATED {present, absent},
    defaultDRB                   BOOLEAN,
    mappedQoS-FlowsToAdd         SEQUENCE (SIZE (1..maxNrofQFIs)) OF QFI
OPTIONAL, -- Need N
    mappedQoS-FlowsToRelease     SEQUENCE (SIZE (1..maxNrofQFIs)) OF QFI
OPTIONAL, -- Need N
    ...
}.
```

As an illustrative example, a service data application protocol (SDAP) entity performs dynamic switching between multiple DRBs for packets of a QoS flow, based on the amount of cumulative data (as determined by the data burst volume (DBV), for example) delivered in a certain period of time (as determined by the PDB, for example) to a DRB (with the data rate being matched to the MDBV requirement, for example). The SDAP entity may operate as follows:
 At the reception of a SDAP service data unit (SDU) from an upper layer for a QoS flow, the SDAP entity will
  If there is no stored QoS flow to DRB mapping for the QoS flow, the SDAP entity will map the SDAP SDU to a default DRB, or
  Map the SDAP SDU to a DRB based on the stored QoS flow to DRB mapping.

Figure 4:
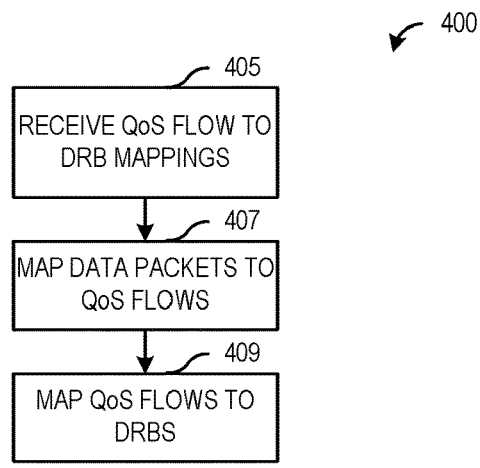
FIG. 4 illustrates a flow diagram of example operations occurring in mapping packets of a QoS flow to a DRB with dynamic switching based on a cumulative characteristic measure according to example embodiments presented herein.

FIG. 4 illustrates a flow diagram of example operations 400 occurring in mapping packets of a QoS flow to a DRB with dynamic switching based on a cumulative characteristic measure. Operations 400 may be indicative of operations occurring in a device, such as a UE, as the device maps packets of a QoS flow to a DRB with dynamic switching based on a cumulative characteristic measure.

Operations 400 begin with the UE receiving QoS flow to DRB mappings (block 405). The QoS flow to DRB mappings may be received in RRC signaling from an access node serving the UE, for example. As an example, a QoS flow may be mapped to two or more DRB mappings, where a particular QoS flow to DRB mapping is based on a cumulative characteristic measure of the QoS flow. Examples of characteristic measures include MDBV, data rate, priority, latency, delay, any other 5QI, etc.

The UE maps data packets to QoS flows (block 407). The mapping of data packets to QoS flows may be in accordance with NAS QoS rules. The packets of a single QoS flow are applied with a QFI associated with the QoS flow. The UE maps the QoS flows to DRBs (block 409). The mapping of the QoS flows to DRBs may include the UE comparing a cumulative characteristic measure of a QoS flow to a threshold, where the threshold may differ between different DRBs. As an example, if a first DRB has a high MDBV and a second DRB has a low MDBV, the cumulative data volume threshold for first DRB may be higher than the cumulative data volume threshold for the second DRB.

Figure 5A:
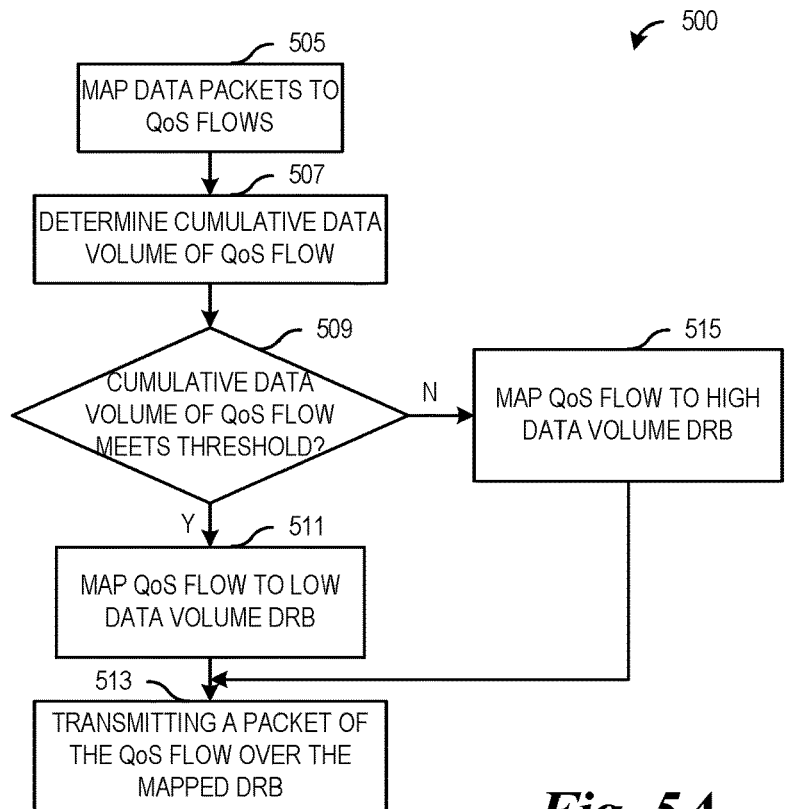
FIG. 5A illustrates a flow diagram of example operations occurring in mapping packets of a QoS flow to a DRB with dynamic switching based on cumulative data burst volume (DBV) according to example embodiments presented herein.

FIG. 5A illustrates a flow diagram of example operations 500 occurring in mapping packets of a QoS flow to a DRB with dynamic switching based on cumulative DBV. Operations 500 may be indicative of operations occurring in a device, such as a UE, as the device maps packets of a QoS flow to a DRB with dynamic switching based on cumulative DBV.

Operations 500 begin with the device mapping data packets to QoS flows (block 505). The mapping of data packets to QoS flows may be in accordance with NAS QoS rules. The packets of a single QoS flow are applied with a QFI associated with the QoS flow. The device determines the cumulative data volume of a QoS flow (block 507). The device may determine the MDBV of the QoS flow. Alternatively, the device may sum the data transmitted over the QoS flow over a duration or an averaging window, for example.

The device performs a check to determine if the cumulative data volume of the QoS flow meets a specified threshold (block 509). The specified threshold may be specified in the configuration of the QoS flows to DRBs mappings, for example. In an embodiment, the specified threshold may be based on the MDBV of the DRBs to which the QoS flow may map. In an embodiment, the specified threshold may be based on the MDBV of the DRB with the smallest MDBV. The specified threshold may specify a cumulative data volume within a specified duration, for example.

If the cumulative data volume of the QoS flow meets the specified threshold, the device maps the QoS flow to a first DRB, e.g., the DRB with the lower MDBV (block 511). In other words, if the cumulative data volume of the QoS flow meets (e.g., is greater than or equal to) the specified threshold, the QoS flow has already conveyed at least the specified threshold's amount of data, so the remaining data to be conveyed by the QoS flow may be relatively low. Hence, the QoS flow may be mapped to the DRB supporting a lower MDBV. As an example, if the specified threshold is about equal to the MDBV of the QoS flow, then the QoS flow is mapped to the first DRB if the cumulative data volume of the QoS flow meets the MDBV of the QoS flow. The device transmits a packet of the QoS flow over the mapped DRB (e.g., the first DRB) (block 513).

If the cumulative data volume of the QoS flow does not meet the specified threshold, the device maps the QoS flow to a second DRB, e.g., the DRB with the higher MDBV (block 515). In other words, if the cumulative data volume of the QoS flow does not meet (e.g., is less than) the specified threshold, the QoS flow has conveyed less than the specified threshold's amount of data, so the remaining data to be conveyed by the QoS flow may be relatively high. Hence, the QoS flow may be mapped to the DRB supporting a higher MDBV. As an example, if the specified threshold is about equal to the MDBV of the QoS flow, then the QoS flow is mapped to the second DRB if the cumulative data volume of the QoS flow does not exceed the MDBV of the QoS flow. The device transmits a packet of the QoS flow over the mapped DRB (e.g., the second DRB) (block 513).

Although the discussion focuses on situations where a QoS flow is mapped to one of two DRBs, the example embodiments presented herein are operable with situations where a QoS flow is mapped to one of three or more DRBs. Therefore, the focus on a QoS flow being mapped to one of two DRBs should not be construed as being limiting to the scope of the example embodiments.

As discussed previously, cumulative data volume is a single example of a cumulative characteristic measure of the QoS flow. The example embodiments are operable with other characteristic measures, which may include latency, delay, any other 5QI, etc.

Figure 5B:
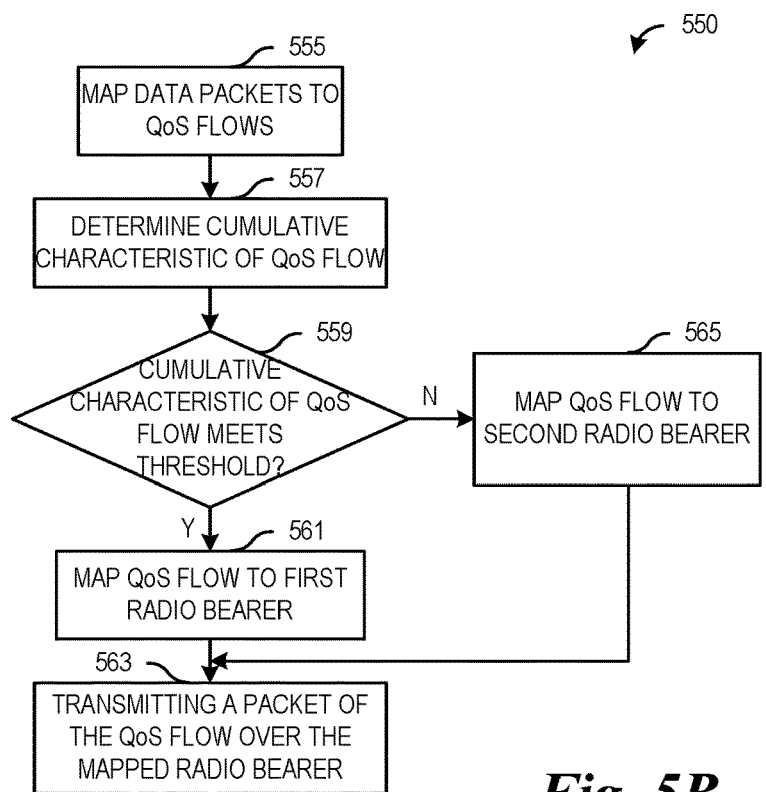
FIG. 5B illustrates a flow diagram of example operations occurring in mapping packets of a QoS flow to a DRB with dynamic switching based on a cumulative characteristic measure according to example embodiments presented herein.

FIG. 5B illustrates a flow diagram of example operations 550 occurring in mapping packets of a QoS flow to a DRB with dynamic switching based on a cumulative characteristic measure. Operations 550 may be indicative of operations occurring in a device, such as a UE, as the device maps packets of a QoS flow to a DRB with dynamic switching based on a cumulative characteristic measure.

Operations 550 begin with the device mapping data packets to QoS flows (block 555). The mapping of data packets to QoS flows may be in accordance with NAS QoS rules. The packets of a single QoS flow are applied with a QFI associated with the QoS flow. The device determines the cumulative characteristic measure of a QoS flow (block 557). The characteristic measure may be one or more of MDBV, data rate, latency, delay, any other 5QI, etc. If the characteristic measure is latency, the cumulative latency may be defined as a maximum permissible latency allowable by the QoS flow. If the characteristic measure is delay, the cumulative delay may be defined as a maximum permissible delay allowable by the QoS flow. Other cumulative characteristic measures may be similarly defined.

The device performs a check to determine if the cumulative characteristic measure of the QoS flow meets a specified threshold (block 559). The specified threshold may be specified in the configuration of the QoS flows to DRBs mappings, for example. In an embodiment, the specified threshold may be based on the cumulative characteristic measure of the DRBs to which the QoS flow may map. In an embodiment, the specified threshold may be based on the cumulative characteristic measure of the DRB with the smallest such characteristic measure.

If the cumulative characteristic measure of the QoS flow meets the specified threshold, the device maps the QoS flow to a first DRB, e.g., the DRB with the lower characteristic measure (block 561). As an example, if the specified threshold is about equal to the cumulative characteristic measure required by the QoS flow, then the QoS flow is mapped to the first DRB if the cumulative characteristic measure of the QoS flow meets the characteristic measure required by the QoS flow. The device transmits a packet of the QoS flow over the mapped DRB (e.g., the first DRB) (block 563).

If the cumulative characteristic measure of the QoS flow does not meet the specified threshold, the device maps the QoS flow to a second DRB, e.g., the DRB with the higher characteristic measure (block 565). As an example, if the specified threshold is about equal to the characteristic measure required by the QoS flow, then the QoS flow is mapped to the second DRB if the characteristic measure of the QoS flow does not meet the characteristic measure required by the QoS flow. The device transmits a packet of the QoS flow over the mapped DRB (e.g., the second DRB) (block 563).

Figure 6:
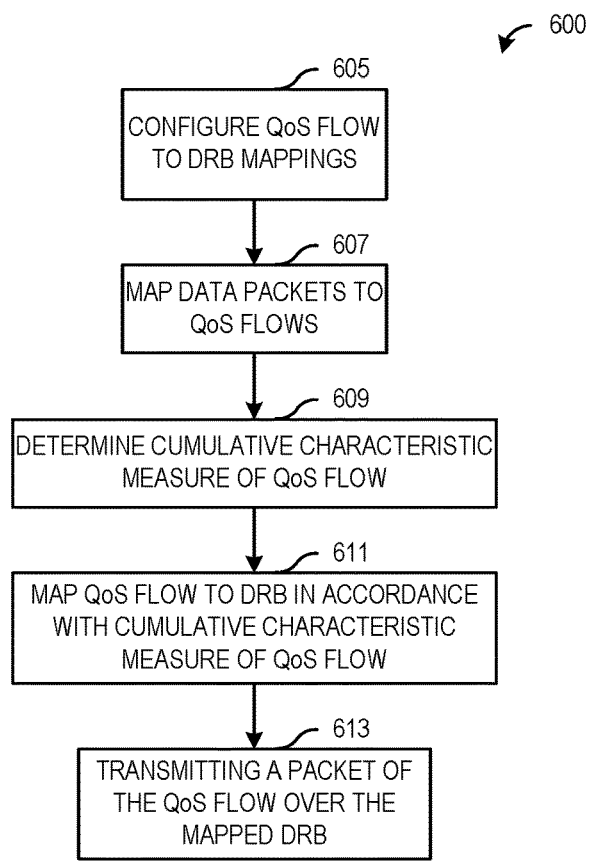
FIG. 6 illustrates a flow diagram of example operations occurring in configuring and mapping QoS flows to DRBs with dynamic switching based on a cumulative characteristic measure according to example embodiments presented herein.

FIG. 6 illustrates a flow diagram of example operations 600 occurring in configuring and mapping QoS flows to DRBs with dynamic switching based on a cumulative characteristic measure. Operations 600 may be indicative of operations occurring in a device, such as a UE, as the device configures and maps QoS flows to DRBs with dynamic switching based on a cumulative characteristic measure.

Operations 600 begin with the device receiving a configuration of QoS flow to DRB mappings (block 605). The configuration of QoS flow to DRB mappings may be received in RRC signaling. The RRC signaling may be received from an access node serving the UE. The QoS flow may be mapped to two or more DRBs based on cumulative characteristic measures of the QoS flow. Examples of characteristic measures include MDBV, data rate, latency, delay, any other 5QI, etc.

The UE maps data packets to QoS flows (block 607). The mapping of data packets to QoS flows may be in accordance with NAS QoS rules. The packets of a single QoS flow are applied with a QFI associated with the QoS flow. The UE determines the cumulative characteristic measure of the QoS flow (block 609). The cumulative characteristic measure may be determined by measuring the QoS flow over a duration or an averaging window, for example.

The UE maps the QoS flow to a DRB in accordance with the cumulative characteristic measure of the QoS flow (block 611). As an example, the UE compares the cumulative characteristic measure of the QoS flow with a threshold and maps the QoS flow to one of the DRBs in accordance with the result of the comparison. The UE transmits a packet of the QoS flow over the mapped DRB (block 613).

Figure 7:
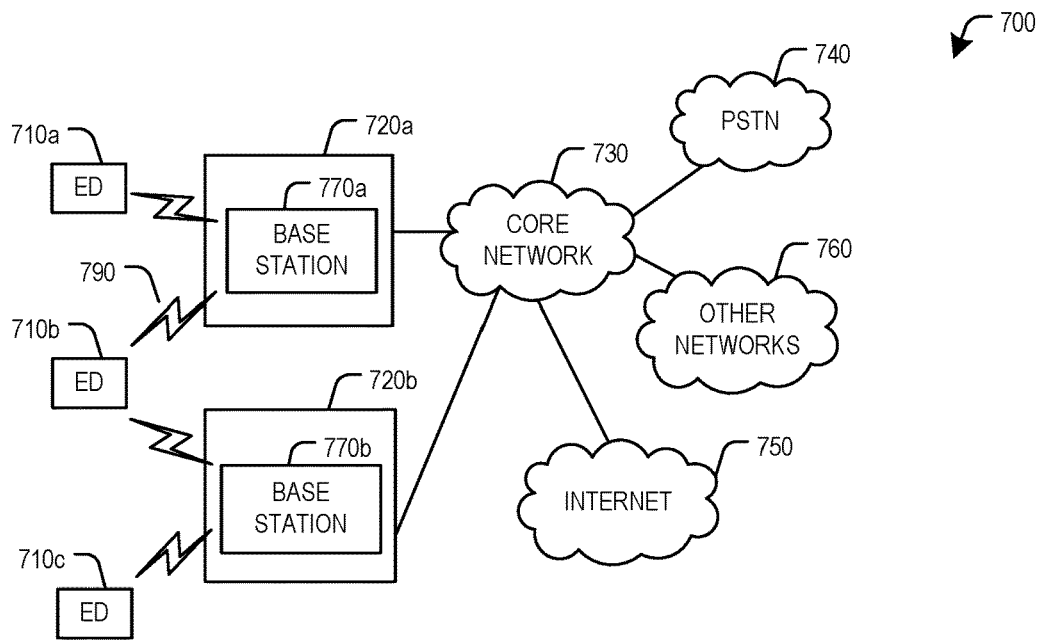
FIG. 7 illustrates an example communication system according to example embodiments presented herein.

FIG. 7 illustrates an example communication system 700. In general, the system 700 enables multiple wireless or wired users to transmit and receive data and other content. The system 700 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 700 includes electronic devices (ED) 710a-710c, radio access networks (RANs) 720a-720b, a core network 730, a public switched telephone network (PSTN) 740, the Internet 750, and other networks 760. While certain numbers of these components or elements are shown in FIG. 7, any number of these components or elements may be included in the system 700.

The EDs 710a-710c are configured to operate or communicate in the system 700. For example, the EDs 710a-710c are configured to transmit or receive via wireless or wired communication channels. Each ED 710a-710c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 720a-720b here include base stations 770a-770b, respectively. Each base station 770a-770b is configured to wirelessly interface with one or more of the EDs 710a-710c to enable access to the core network 730, the PSTN 740, the Internet 750, or the other networks 760. For example, the base stations 770a-770b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 710a-710c are configured to interface and communicate with the Internet 750 and may access the core network 730, the PSTN 740, or the other networks 760.

In the embodiment shown in FIG. 7, the base station 770a forms part of the RAN 720a, which may include other base stations, elements, or devices. Also, the base station 770b forms part of the RAN 720b, which may include other base stations, elements, or devices. Each base station 770a-770b operates to transmit or receive wireless signals within a particular geographic region or area, sometimes referred to as a "cell." In some embodiments, multiple-input multiple-output (MIMO) technology may be employed having multiple transceivers for each cell.

The base stations 770a-770b communicate with one or more of the EDs 710a-710c over one or more air interfaces 790 using wireless communication links. The air interfaces 790 may utilize any suitable radio access technology.

It is contemplated that the system 700 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 720a-720b are in communication with the core network 730 to provide the EDs 710a-710c with voice, data, application, Voice over Internet Protocol (VoIP), or other services. Understandably, the RANs 720a-720b or the core network 730 may be in direct or indirect communication with one or more other RANs (not shown). The core network 730 may also serve as a gateway access for other networks (such as the PSTN 740, the Internet 750, and the other networks 760). In addition, some or all of the EDs 710a-710c may include functionality for communicating with different wireless networks over different wireless links using different wireless technologies or protocols. Instead of wireless communication (or in addition thereto), the EDs may communicate via wired communication channels to a service provider or switch (not shown), and to the Internet 750.

Although FIG. 7 illustrates one example of a communication system, various changes may be made to FIG. 7. For example, the communication system 700 could include any number of EDs, base stations, networks, or other components in any suitable configuration.

Figure 8A:
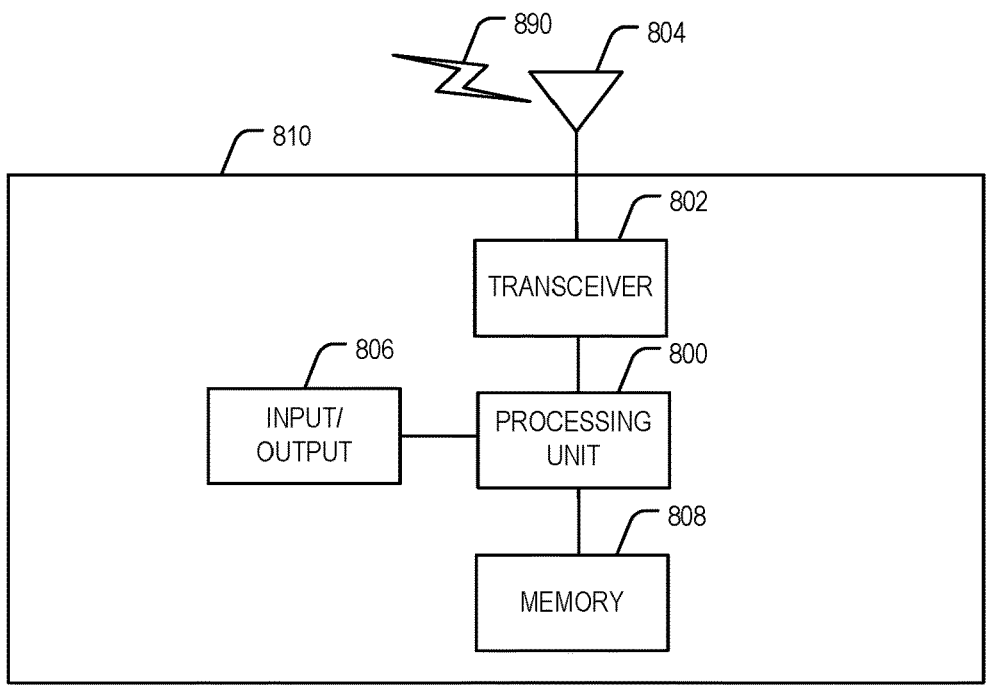
FIGS. 8A and 8B illustrate example devices that may implement the methods and teachings according to this disclosure.
Figure 8B:
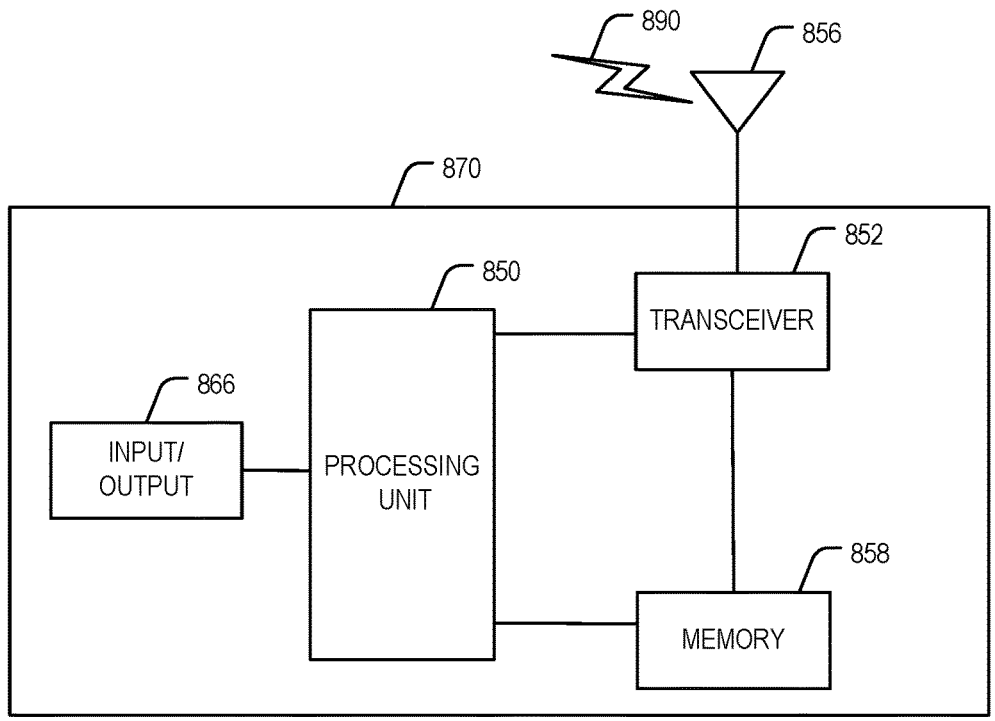

FIGS. 8A and 8B illustrate example devices that may implement the methods and teachings according to this disclosure. In particular, FIG. 8A illustrates an example ED 810, and FIG. 8B illustrates an example base station 870. These components could be used in the system 700 or in any other suitable system.

As shown in FIG. 8A, the ED 810 includes at least one processing unit 800. The processing unit 800 implements various processing operations of the ED 810. For example, the processing unit 800 could perform signal coding, data processing, power control, input/output processing, or any other functionality enabling the ED 810 to operate in the system 700. The processing unit 800 also supports the methods and teachings described in more detail above. Each processing unit 800 includes any suitable processing or computing device configured to perform one or more operations. Each processing unit 800 could, for example, include a microprocessor, microcontroller, digital signal processor, field programmable gate array, or application specific integrated circuit.

The ED 810 also includes at least one transceiver 802. The transceiver 802 is configured to modulate data or other content for transmission by at least one antenna or NIC (Network Interface Controller) 804. The transceiver 802 is also configured to demodulate data or other content received by the at least one antenna 804. Each transceiver 802 includes any suitable structure for generating signals for wireless or wired transmission or processing signals received wirelessly or by wire. Each antenna 804 includes any suitable structure for transmitting or receiving wireless or wired signals. One or multiple transceivers 802 could be used in the ED 810, and one or multiple antennas 804 could be used in the ED 810. Although shown as a single functional unit, a transceiver 802 could also be implemented using at least one transmitter and at least one separate receiver.

The ED 810 further includes one or more input/output devices 806 or interfaces (such as a wired interface to the Internet 750). The input/output devices 806 facilitate interaction with a user or other devices (network communications) in the network. Each input/output device 806 includes any suitable structure for providing information to or receiving information from a user, such as a speaker, microphone, keypad, keyboard, display, or touch screen, including network interface communications.

In addition, the ED 810 includes at least one memory 808. The memory 808 stores instructions and data used, generated, or collected by the ED 810. For example, the memory 808 could store software or firmware instructions executed by the processing unit(s) 800 and data used to reduce or eliminate interference in incoming signals. Each memory 808 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8B, the base station 870 includes at least one processing unit 850, at least one transceiver 852, which includes functionality for a transmitter and a receiver, one or more antennas 856, at least one memory 858, and one or more input/output devices or interfaces 866. A scheduler, which would be understood by one skilled in the art, is coupled to the processing unit 850. The scheduler could be included within or operated separately from the base station 870. The processing unit 850 implements various processing operations of the base station 870, such as signal coding, data processing, power control, input/output processing, or any other functionality. The processing unit 850 can also support the methods and teachings described in more detail above. Each processing unit 850 includes any suitable processing or computing device configured to perform one or more operations. Each processing unit 850 could, for example, include a microprocessor, microcontroller, digital signal processor, field programmable gate array, or application specific integrated circuit.

Each transceiver 852 includes any suitable structure for generating signals for wireless or wired transmission to one or more EDs or other devices. Each transceiver 852 further includes any suitable structure for processing signals received wirelessly or by wire from one or more EDs or other devices. Although shown combined as a transceiver 852, a transmitter and a receiver could be separate components. Each antenna 856 includes any suitable structure for transmitting or receiving wireless or wired signals. While a common antenna 856 is shown here as being coupled to the transceiver 852, one or more antennas 856 could be coupled to the transceiver(s) 852, allowing separate antennas 856 to be coupled to the transmitter and the receiver if equipped as separate components. Each memory 858 includes any suitable volatile or non-volatile storage and retrieval device(s). Each input/output device 866 facilitates interaction with a user or other devices (network communications) in the network. Each input/output device 866 includes any suitable structure for providing information to or receiving/providing information from a user, including network interface communications.

Figure 9:
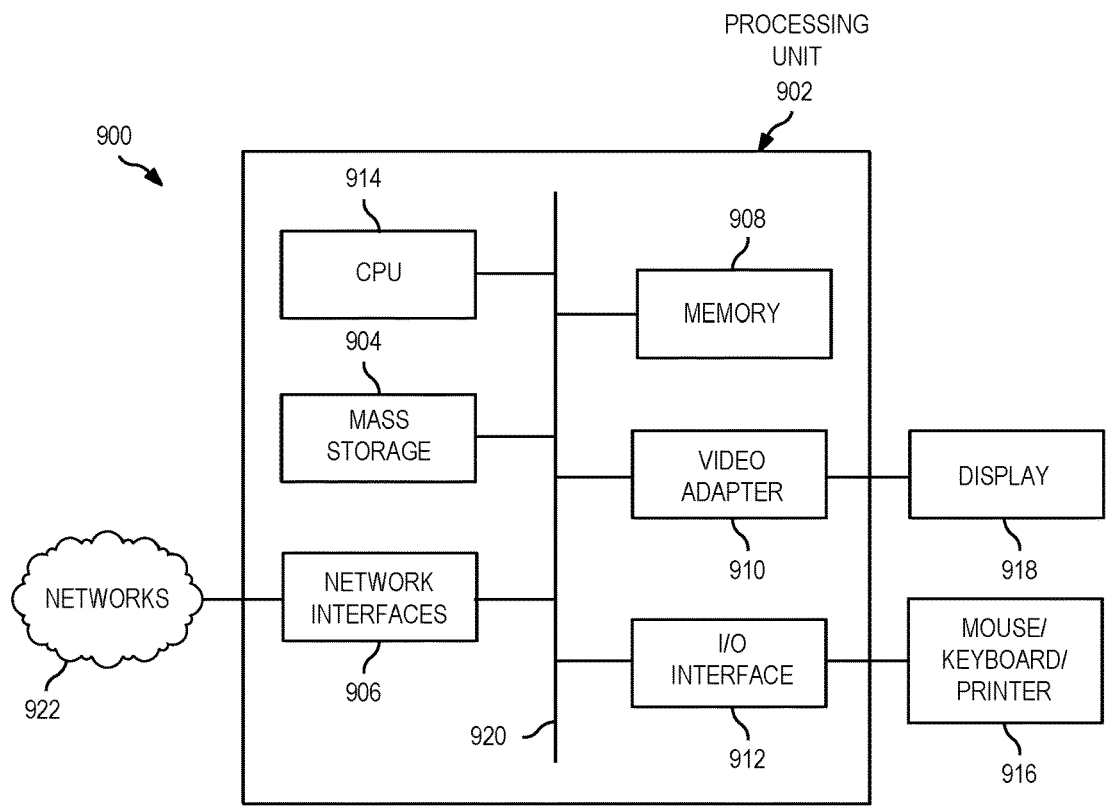
FIG. 9 is a block diagram of a computing system that may be used for implementing the devices and methods disclosed herein.

FIG. 9 is a block diagram of a computing system 900 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 900 includes a processing unit 902. The processing unit includes a central processing unit (CPU) 914, memory 908, and may further include a mass storage device 904, a video adapter 910, and an I/O interface 912 connected to a bus 920.

The bus 920 may be one or more of any type of several bus architectures including a memory bus or memory controller, a peripheral bus, or a video bus. The CPU 914 may comprise any type of electronic data processor. The memory 908 may comprise any type of non-transitory system memory such as static random access memory (SRAM), dynamic random access memory (DRAM), synchronous DRAM (SDRAM), read-only memory (ROM), or a combination thereof. In an embodiment, the memory 908 may include ROM for use at boot-up, and DRAM for program and data storage for use while executing programs.

The mass storage 904 may comprise any type of non-transitory storage device configured to store data, programs, and other information and to make the data, programs, and other information accessible via the bus 920. The mass storage 904 may comprise, for example, one or more of a solid state drive, hard disk drive, a magnetic disk drive, or an optical disk drive.

The video adapter 910 and the I/O interface 912 provide interfaces to couple external input and output devices to the processing unit 902. As illustrated, examples of input and output devices include a display 918 coupled to the video adapter 910 and a mouse, keyboard, or printer 916 coupled to the I/O interface 912. Other devices may be coupled to the processing unit 902, and additional or fewer interface cards may be utilized. For example, a serial interface such as Universal Serial Bus (USB) (not shown) may be used to provide an interface for an external device.

The processing unit 902 also includes one or more network interfaces 906, which may comprise wired links, such as an Ethernet cable, or wireless links to access nodes or different networks. The network interfaces 906 allow the processing unit 902 to communicate with remote units via the networks. For example, the network interfaces 906 may provide wireless communication via one or more transmitters/transmit antennas and one or more receivers/receive antennas. In an embodiment, the processing unit 902 is coupled to a local-area network 922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a mapping unit or module, or a determining unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
 determining, by a communication device, a cumulative data volume of a first quality of service (QOS) flow;
 determining, by the communication device, that the cumulative data volume of the first QoS flow meets a specified data threshold;
 mapping, by the communication device, the first QoS flow to a first data radio bearer, wherein a maximum data volume of the first data radio bearer is less than a maximum data volume of the first QoS flow; and
 transmitting, by the communication device, a packet of the first QoS flow over the first data radio bearer.

2. The method of claim 1, further comprising:
 receiving, by the communication device, a data radio bearer configuration for the first data radio bearer.

3. The method of claim 2, the data radio bearer configuration being received in a radio resource control (RRC) message.

4. The method of claim 2, further comprising:
 determining, by the communication device, a second cumulative data volume of a second QoS flow; and
 determining, by the communication device, that the second cumulative data volume of the second QoS flow fails to meet the specified data threshold;
 mapping, by the communication device, the second QoS flow to a second data radio bearer, wherein a second maximum data volume of the second data radio bearer is greater than a second maximum data volume of the second QoS flow; and
 transmitting, by the communication device, a second packet of the second QoS flow over the second data radio bearer.

5. The method of claim 1, the communication device comprising a user equipment (UE).

6. The method of claim 1, the mapping the first QoS flow to the first data radio bearer being performed by a service data application protocol (SDAP) layer entity of the communication device.

7. A method comprising:
 determining, by a communication device, a cumulative characteristic measure of a quality of service (QOS) flow;
 mapping, by the communication device, the QoS flow to a data radio bearer of a plurality of data radio bearers in accordance with a comparison between the cumulative characteristic measure of the QoS flow and a specified characteristic threshold, the mapping the QoS flow comprising:
 determining, by the communication device, if the cumulative characteristic measure of the QoS flow meets the specified characteristic threshold;

mapping, by the communication device, the QoS flow to a first data radio bearer in response to that the cumulative characteristic measure of the QoS flow meets the specified characteristic threshold; and mapping, by the communication device, the QoS flow to a second data radio bearer in response to that the cumulative characteristic measure of the QoS flow fails to meet the specified characteristic threshold, wherein a first cumulative characteristic measure of the first data radio bearer is greater than a second cumulative characteristic measure of the second data radio bearer; and transmitting, by the communication device, a packet of the QoS flow over the data radio bearer, the data radio bearer being one of the first data radio bearer or the second data radio bearer.

8. The method of claim 7, further comprising:
receiving, by the communication device, a data radio bearer configuration for the plurality of data radio bearers in a radio resource control (RRC) message.

9. The method of claim 7, the cumulative characteristic measure comprising at least one of a maximum data burst volume, a cumulative data rate, a cumulative latency, a cumulative delay, or a cumulative Fifth Generation QoS identifier parameter.

10. The method of claim 7, wherein the mapping the QoS flow occurs dynamically.

11. A device, comprising:
one or more processors; and
a non-transitory memory storage comprising instructions that, when executed by the one or more processors, cause the device to perform operations including:
determining a cumulative data volume of a first quality of service (Qos) flow;
determining that the cumulative data volume of the first QoS flow meets a specified data threshold;
mapping the first QoS flow to a first data radio bearer, wherein a maximum data volume of the first data radio bearer is less than a maximum data volume of the first QoS flow; and
transmitting a packet of the first QoS flow over the first data radio bearer.

12. The device of claim 11, the operations further comprising:
receiving a data radio bearer configuration for the first data radio bearer.

13. The device of claim 12, the data radio bearer configuration being received in a radio resource control (RRC) message.

14. The device of claim 12, the operations further comprising:
determining a second cumulative data volume of a second QoS flow;
determining that the second cumulative data volume of the second QoS flow fails to meet the specified data threshold;

mapping the second QoS flow to a second data radio bearer, wherein a second maximum data volume of the second data radio bearer is greater than a second maximum data volume of the second QoS flow; and
transmitting a second packet of the second QoS flow over the second data radio bearer.

15. The device of claim 11, the device comprising a user equipment (UE).

16. The device of claim 11, wherein a service data application protocol (SDAP) layer entity of the device maps the first QoS flow to the first data radio bearer.

17. A device, comprising:
one or more processors; and
a non-transitory memory storage comprising instructions that, when executed by the one or more processors, cause the device to perform operations including:
determining a cumulative characteristic measure of a quality of service (QoS) flow;
mapping the QoS flow to a data radio bearer of a plurality of data radio bearers in accordance with a comparison between the cumulative characteristic measure of the QoS flow and a specified characteristic threshold, the mapping the QoS flow comprising:
determining if the cumulative characteristic measure of the QoS flow meets the specified characteristic threshold;
mapping the QoS flow to a first data radio bearer in response to that the cumulative characteristic measure of the QoS flow meets the specified characteristic threshold; and
mapping the QoS flow to a second data radio bearer in response to that the cumulative characteristic measure of the QoS flow fails to meet the specified characteristic threshold, wherein a first cumulative characteristic measure of the first data radio bearer is greater than a second cumulative characteristic measure of the second data radio bearer; and
transmitting a packet of the QoS flow over the data radio bearer, the data radio bearer being one of the first data radio bearer or the second data radio bearer.

18. The device of claim 17, the operations further comprising:
receiving a data radio bearer configuration for the plurality of data radio bearers in a radio resource control (RRC) message.

19. The device of claim 17, the cumulative characteristic measure comprising at least one of a maximum data burst volume, a cumulative data rate, a cumulative latency, a cumulative delay, or a cumulative Fifth Generation QoS identifier parameter.

20. The device of claim 17, wherein the mapping of the QoS flow occurs dynamically.

* * * * *

UNITED STATES PATENT AND TRADEMARK OFFICE
CERTIFICATE OF CORRECTION

PATENT NO. : 12,432,609 B2  
APPLICATION NO. : 17/662330  
DATED : September 30, 2025  
INVENTOR(S) : Hao Bi Page 1 of 1

It is certified that error appears in the above-identified patent and that said Letters Patent is hereby corrected as shown below:

In the Claims

In Column 14, in Claim 1, Line 19, delete "(QOS)" and insert -- (QoS) --.

In Column 14, in Claim 7, Line 57, delete "(QOS)" and insert -- (QoS) --.

In Column 15, in Claim 11, Line 34, delete "(Qos)" and insert -- (QoS) --.

Signed and Sealed this  
Fourth Day of November, 2025

John A. Squires  
*Director of the United States Patent and Trademark Office*